(12) United States Patent
Inoue et al.

(10) Patent No.: US 6,893,715 B2
(45) Date of Patent: May 17, 2005

(54) RESIN COMPOSITIONS FOR SEALANTS AND FILMS

(75) Inventors: Norihide Inoue, Ichihara (JP); Takashi Kimura, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/440,272

(22) Filed: May 19, 2003

(65) Prior Publication Data

US 2003/0215591 A1 Nov. 20, 2003

(30) Foreign Application Priority Data

May 20, 2002 (JP) ........................................ 2002-145347
Sep. 2, 2002 (JP) ........................................ 2002-256253

(51) Int. Cl.[7] .......................... C08L 23/12; C08L 23/16; C08L 53/00
(52) U.S. Cl. ........................ 428/332; 525/191; 525/197; 525/240
(58) Field of Search .......................... 428/332; 525/191, 525/197, 240

(56) References Cited

U.S. PATENT DOCUMENTS 5,302,442 A  *  4/1994  O'Brien ...................... 428/213
5,473,016 A       12/1995  Fujii et al.
6,300,415 B1  *  10/2001  Okayama et al. ........... 525/191
6,743,523 B1  *  6/2004  Woo et al. ................... 428/516

FOREIGN PATENT DOCUMENTS

WO         WO 9317863 A        9/1993

OTHER PUBLICATIONS

Patent Abstracts of Japan, Publication No. 07109389, Publication Date Apr. 25, 1995.

* cited by examiner

Primary Examiner—Sandra M. Nolan-Rayford
(74) Attorney, Agent, or Firm—Birch, Stewart, Kolasch & Birch, LLP

(57) ABSTRACT

A composition for sealants and films comprising polymers (A-b), (B-b) and from 0 to 50% by weight (C-b) is taught. Polymer (A-b) contains 10 to 70% by weight of an ethylene/α-olefin polymer having a α-olefin content of 7 to 30 mol %, a density of 0.850 to 0.900 g/cm$^3$ and a melt flow rate (MFR-A), at 190° C., of 0.1 to 10 g/10 min. Polymer (B-b) contains 10 to 80 wt % propylene polymer with a melt flow rate (MFR-B), at 230° C., of 0.5 to 100 g/10 min. Polymer (C-b) contains an ethylene polymer having a density of 0.900 to 0.960 g/cm$^3$. The ratio of MFR-B to MFR-A is 3 to 500.

12 Claims, No Drawings

RESIN COMPOSITIONS FOR SEALANTS AND FILMS

This nonprovisional application claims priority under 35 USC 119(a) from patent application 2002-145347, filed in Japan on May 20, 2002 and application 2002-256253, filed in Japan on Sep. 2, 2002, which are hereby incorporated by reference.

FIELD OF THE INVENTION

The present invention relates to a resin composition for a sealant and uses thereof. More particularly, the invention relates to a laminate having both of sealing properties and heat-sealing properties, a resin composition for a sealant enabling production of an easy peel container using the laminate, a laminate of the composition, and an easy peel container (e.g., container in the form of bag or cup) of the laminate.

BACKGROUND OF THE INVENTION

With diversification of foods in recent years, various packaging materials have been proposed. In particular, containers having easy peel properties are widely used as those for instant noodles, yogurt, confectionary and other foods. The containers having easy peel properties are required to simultaneously satisfy sealing properties and easy peel properties which are conflicting with each other. Further, with diversification of food containers, development of sealant films having various heat-sealing strengths has been eagerly desired.

For appearance of high sealing properties, however, high sealing strength is necessary, and increase of the sealing strength is accompanied by a problem of deterioration of easy peel properties.

Accordingly, there has been desired development of a laminate having both of sealing properties and heat-sealing properties, a resin composition for a sealant enabling production of an easy peel container using the laminate, a laminate of the composition, and a container (e.g., bag-like container or cup) obtained from the laminate.

On the other hand, films obtained from polypropylene have heat resistance, so that they have been widely used as packaging materials to be subjected to heat sterilization, such as those for retort foods. Recently, easy peel films or sealants having such heat resistance as to withstand the heat sterilization have been studied.

OBJECT OF THE INVENTION

The present invention is intended to solve such problems associated with the prior art as described above, and it is an object of the invention to provide a laminate having both of sealing properties and heat-sealing properties, a resin composition for a sealant enabling production of an easy peel container using the laminate, a laminate of the composition, and a container (e.g., bag-like container or cup) obtained from the laminate.

It is another object of the invention to provide a resin composition for a sealant capable of exhibiting high sealing properties and easy peel properties, a laminate obtained from the composition, and an easy peel container using the laminate.

SUMMARY OF THE INVENTION

The resin composition (a) for a sealant according to the present invention comprises:

(A-a) an ethylene polymer having a density (ASTM D 1505) of 0.900 to 0.960 g/cm$^3$ and a melt flow rate (ASTM D 1238, 190° C., load of 2.16 kg) of 0.1 to 70 g/10 min, in an amount of 10 to 70% by weight, (B-a) a propylene polymer in an amount of 10 to 80% by weight, and (C-a) a butene polymer in an amount of 10 to 70% by weight.

The ethylene polymer (A-a) is preferably high-pressure polyethylene having a density (ASTM D 1505) of 0.905 to 0.940 g/cm$^3$.

The laminate according to the present invention is a laminate having at least two layers and a layer structure comprising a layer (P) comprised of a propylene random copolymer and a layer (S) comprised of the above-mentioned resin composition for a sealant, the layer (S) being adjacent to the layer (P).

The thickness of the layer (P) comprised of a propylene random copolymer is in the range of preferably 1 to 50 $\mu$m, particularly preferably 2 to 30 $\mu$m.

The container according to the present invention is a container comprising a laminate which is the above-mentioned laminate of the invention and has a layer structure of three or more layers wherein at least one surface layer is the layer (P) comprised of a propylene random copolymer, and is a bag-like container obtained by allowing the layers (P) of the laminates to face each other and heat sealing a part of the periphery.

Specifically, there can be mentioned, for example, the following containers (1) and (2).

(1) A container comprising a laminate which is the laminate of the invention and has a layer structure of three or more layers wherein at least one surface layer is the layer (P) comprised of a propylene random copolymer, said container being a bag-like container obtained by folding the laminate in two in such a manner that the layer (P) comes inside to allow the layers (P) to face each other and heat sealing a part of the periphery.

(2) A container comprising two laminates each of which is the laminate of the invention and has a layer structure of three or more layers wherein at least one surface layer is the layer (P) comprised of a propylene random copolymer, said container being a bag-like container obtained by allowing the layers (P) of the two laminates to face each other and heat sealing a part of the periphery.

Another container according to the present invention is a container comprising a cup formed from a laminate which is the laminate of the invention and has a layer structure of three or more layers wherein at least one surface layer is the layer (P) comprised of a propylene random copolymer, and a cap heat sealed to a surface of the layer (P) of the cup.

The present invention also relates to a resin composition (b) for a sealant, comprising:

(A-b) an ethylene/α-olefin copolymer having a density of 0.850 to 0.900 g/cm$^3$ and a melt flow rate (MFR-A), as measured at 190° C., of 0.1 to 10 g/10 min, in an amount of 10 to 70% by weight, (B-b) a propylene polymer having a melt flow rate (MFR-B), as measured at 230° C., of 0.5 to 100 g/10 min and a ratio of MFR-B to MFR-A (MFR-B/MFR-A) of 3 or more, in an amount of 10 to 80% by weight, and (C-b) an ethylene polymer having a density of 0.900 to 0.960 g/cm$^3$, in an amount of 0 to 50% by weight.

The present invention also relates to a sealant film obtained from the above-mentioned resin composition, a laminate comprising the sealant film, and a container formed from the laminate.

DETAILED DESCRIPTION OF THE INVENTION

The resin compositions for a sealant according to the invention and uses thereof are described in detail hereinafter.

Resin Composition (a) for Sealant

First, the resin composition (a) for a sealant according to the invention is described.

The resin composition (a) according to the invention comprises an ethylene polymer (A-a), a propylene polymer (B-a) and a butene polymer (C-a).

Ethylene Polymer (A-a)

The ethylene polymer (A-a) for use in the invention may be an ethylene homopolymer or an ethylene/α-olefin copolymer, and its molecular structure may be a linear one or a branched one having long or short side chain.

The ethylene/α-olefin copolymer is desirably a random copolymer of ethylene and an α-olefin of 3 to 20 carbon atoms, preferably 3 to 10 carbon atoms. Examples of such α-olefins include propylene, 1-butene, 1-pentene, 1-hexene, 4-methyl-1-pentene, 1-octene, 1-decene and 1-dodecene. These α-olefins can be used singly or in combination of two or more kinds. Of these, propylene, 1-butene, 1-hexene and 1-octene are preferable.

In the preparation of the ethylene/α-olefin copolymer, dienes, such as 1,6-hexadiene and 1,8-octadiene, or cycloolefins, such as cyclopentene, can be used as other comonomers in small amounts, when needed.

In the ethylene/α-olefin copolymer (including an ethylene/α-olefin/polyene copolymer), the content of constituent units derived from ethylene (referred to as "ethylene content" hereinafter) is in the range of usually 85 to 99.9% by mol, preferably 90 to 99.5% by mol. Formulation of the ethylene/α-olefin copolymer is usually determined by homogeneously dissolving about 200 mg of the ethylene/α-olefin copolymer in 1 ml of hexachlorobutadiene in a sample tube of 10 mm diameter to give a sample and measuring a $^{13}$C-NMR spectrum of the sample under the conditions of a measuring frequency of 25.05 MHz, a spectral width of 1500 Hz, a pulse repetition time of 4.2 sec. and a plus width of 6 $\mu$sec.

The ethylene polymer (A-a) has a density of 0.900 to 0.960 g/cm$^3$, preferably 0.905 to 0.950 g/cm$^3$ more preferably 0.905 to 0.940 g/cm$^3$, and is so-called low-density or medium-density polyethylene. When the ethylene polymer (A-a) having a density of the above range is used, a resin composition capable of forming a sealant film exhibiting excellent heat-sealing properties is obtained. Further, when a container is produced from a laminated film having a layer of the resin composition of the invention as a heat-sealing layer (which becomes an inner layer of the container), the container can be filled with the contents in a high filling rate because of small tackiness of the inner layer. The density was measured by the use of a density gradient tube in accordance with ASTM D 1505.

The melt flow rate of the ethylene polymer (A-a) as measured at 190° C. under a load of 2.16 kg (referred to as "MFR(190° C.)" hereinafter) in accordance with ASTM D-1238 is in the range of 0.1 to 70 g/10 min, preferably 1 to 40 g/10 min. When the ethylene polymer (A-a) having a melt flow rate of this range is used, a resin composition capable of forming a sealant film at a high speed by the existing molding machine is obtained.

Although there is no specific limitation on the process for preparing the ethylene polymer (A-a), the polymer can be prepared by homopolymerizing ethylene or copolymerizing ethylene and an α-olefin using a radical polymerization catalyst, a Phillips catalyst, a Ziegler-Natta catalyst or a metallocene catalyst.

As the ethylene polymer (A-a), a polymer having a relationship between MFR(190° C.) and a melt tension (measured at 190° C., unit: mN, referred to as "MT" hereinafter) satisfying the following formula is particularly preferable.

$$40 \times [MFR(190° C.)]^{-0.67} \leq MT \leq 250 \times [MFR(190° C.)]^{-0.67}$$

An example of the ethylene polymer (A-a) satisfying the above relationship is so-called high-pressure low-density polyethylene obtained by radical polymerization.

As the ethylene polymer (A-a), a composition obtained by blending several kinds of ethylene polymers (A-a), such as a blend of high-pressure low-density polyethylene and a linear ethylene/α-olefin copolymer, is also employable.

Further, the ethylene polymer (A-a) for use in the invention may be a mixture of at least two ethylene polymers having different densities and different melt flow rates, such as a blend of high-pressure polyethylene and an ethylene/1-butene copolymer.

Propylene Polymer (B-a)

The propylene polymer (B-a) for use in the invention is a propylene homopolymer publicly known or a random or block copolymer of propylene and ethylene or an α-olefin of 4 to 20 carbon atoms. Especially, a propylene polymer (B-a) having a melt flow rate, as measured at 230° C. under a load of 2.16 kg (referred to as "MFR(230° C.)" hereinafter) in accordance with ASTM D-1238, of 0.1 to 100 g/10 min, preferably 0.3 to 70 g/10 min, more preferably 0.5 to 50 g/10 min, is preferable, and a propylene/α-olefin random copolymer is particularly preferable. When the propylene polymer (B-a) having MFR(230° C.) of the above range is used, a resin composition capable of forming a sealant film well balanced between the sealing strength and the peel properties is obtained.

The propylene polymer (B-a) can be prepared by polymerizing propylene or copolymerizing propylene and ethylene or an α-olefin of 4 to 20 carbon atoms in the presence of, typically, a catalyst containing a solid titanium catalyst and an organometallic compound as main components or a metallocene catalyst containing a metallocene compound as one component.

In the present invention, the propylene polymer (B-a) can be used singly or in combination of two or more kinds.

Butene Polymer (C-a)

The butene polymer (C-a) for use in the invention is a 1-butene homopolymer or a copolymer of 1-butene and an α-olefin of 2 to 20 carbon atoms, preferably 2 to 10 carbon atoms, other than 1-butene.

Examples of the α-olefins include ethylene, propylene, 1-hexene, 4-methyl-1-pentene and 1-octene.

In the butene polymer (C-a), the content of constituent units derived from 1-butene (referred to as "1-butene content" hereinafter) is in the range of usually 60 to 100% by mol, preferably 70 to 100% by mol.

The density (ASTM D 1505) of the butene polymer (C-a) is in the range of usually 0.880 to 0.925 g/cm$^3$, preferably 0.885 to 0.920 g/cm$^3$. When the butene polymer (C-a) having a density of this range is used, a resin composition capable of forming a sealant film having small tackiness is obtained. Further, when a container is produced from a laminated film having a layer of the resin composition of the invention as a heat-sealing layer (which becomes an inner layer of the container), the tackiness of the inner layer is small, so that the film hardly sticks to the equipment such as a roll, and the container can be filled with the contents at a high filling rate.

The MFR(190° C.) of the butene polymer (C-a) is in the range of usually 0.1 to 25 g/10 min, preferably 0.5 to 25 g/10 min, more preferably 1 to 25 g/10 min. When the butene polymer (C-a) having MFR(190° C.) of this range is used, a resin composition capable of forming a sealant film at a high speed without imposing an excessive burden on a motor of the molding machine is obtained.

The butene polymer (C-a) can be prepared by a polymerization process using a stereoregular catalyst described in, for example, Japanese Patent Publication No. 7088/1989, Japanese Patent Laid-Open Publication No. 206415/1984, Japanese Patent Laid-Open Publication No. 206416/1984, Japanese Patent Laid-Open Publication No. 218508/1992, Japanese Patent Laid-Open Publication No. 218607/1992 or Japanese Patent Laid-Open Publication No. 225605/1996.

In the present invention, the butene polymer (C-a) can be used singly or in combination of two or more kinds.

Resin Composition

The resin composition (a) for a sealant according to the invention comprises the ethylene polymer (A-a), the propylene polymer (B-a) and the butene polymer (C-a). The amount of the component (A-a) is in the range of 10 to 70% by weight, preferably 10 to 50% by weight, the amount of the component (B-a) is in the range of 10 to 80% by weight, preferably 20 to 70% by weight, and the amount of the component (C-a) is in the range of 10 to 70% by weight, preferably 10 to 50% by weight. The total amount of the components (A-a), (B-a) and (C-a) is 100% by weight. When the amounts of these components are in the above ranges, a sealant film obtained from the composition exhibits excellent easy peel properties, and by the use of the film, an easy-peelable container favorable for practical use is obtained.

The resin composition (a) of the invention is useful as a sealant having easy peel properties when used alone to form a film, but as described later, by laminating the film onto a specific resin layer, a laminate having excellent sealing properties and easy peel properties can be obtained.

To the resin composition (a), additives, such as antioxidant, heat stabilizer, weathering stabilizer, slip agent, anti-blocking agent and crystal nucleating agent, can be added when needed, within limits not detrimental to the objects of the invention.

It is possible that the above-mentioned components and various additives optionally used are blended by a mixing machine, such as a Henschel mixer, a Banbury mixer or a tumbling mixer, then the blend is extruded by a single-screw or twin-screw extruder to prepare pellets, and the pellets are used in the later-described film molding. It is also possible that the blend of the components is fed to a film molding machine and directly subjected to the film molding.

By film molding the resin composition (a) of the invention, a sealant film of a packaging material requiring easy peel properties can be produced. The film molding method may be a cast molding method or an inflation molding method, and an excellent film having a uniform thickness can be produced at a resin temperature of usually 180 to 240° C. The thickness of the film is in the range of usually 1 to 100 µm, preferably 3 to 80 µm.

Laminate

Although the sealant film may be used alone, it is preferably used as a packaging film or a packaging sheet by constituting a laminate comprising a layer (P) comprised of a propylene random copolymer and a layer (S) comprised of the above-mentioned resin composition of the invention as at least one adjacent layer to the layer (P).

The propylene random copolymer to form the layer (P) is, for example, a random copolymer of propylene and ethylene or an α-olefin of 4 to 20 carbon atoms. Especially, it is preferable to use a propylene random copolymer having a melt flow rate, as measured at 230° C. under a load of 2.16 kg (referred to as "MFR(230° C.)" hereinafter) in accordance with ASTM D 1238, of 0.1 to 100 g/10 min, preferably 0.3 to 70 g/10 min, more preferably 0.5 to 50 g/10 min, and a melting point, as measured by differential scanning calorimetry (DSC), of 110 to 155° C.

In the present invention, to the laminate of at least two layers comprising the layer (P) and the layer (S), a substrate may be further laminated.

The substrate is not specifically restricted, but for example, polyolefin such as polyethylene or polypropylene, a styrene resin, polyester such as polyethylene terephthalate or polybutylene terephthalate, polyamide such as nylon 6 or nylon 6,6, a stretched film thereof, a laminate comprising polyolefin and a gas barrier resin such as polyamide or an ethylene/vinyl alcohol copolymer, a metal foil such as an aluminum foil, a metallized (deposited) film having deposited aluminum, silica or the like, or a paper is appropriately selected and used according to the use purpose of the packaging material. For the substrate, these materials may be used singly or in combination of two or more kinds.

The laminate comprising the layer (P), the layer (S), and optionally, the substrate can be produced by a conventionally known method, such as an extrusion lamination method, a dry lamination method or a co-extrusion method.

In the present invention, it is preferable to so design the laminate that the layer (P) is positioned as at least one of the outermost layers and becomes a sealant layer. By taking such a structure and by combining the sealant layer with another sealant layer or a cap material, a container having excellent sealing properties and easy peel properties is obtained.

Container

A container can be produced by allowing the layers (P) of the laminates to face each other or allowing the layer (S) of the laminate to face another film and then heat sealing at least a part of the periphery so as to give a desired container shape. By heat sealing the whole periphery, a sealed container in the form of a bag (sealed bag container) can be produced. If the molding process for producing the bag container is combined with a process for filling the contents, that is, if the contents are filled after heat sealing of the bottom and the sides of the bag container and then the top is heat sealed, a sealed package can be produced. Therefore, the laminate can be used in an automatic packaging apparatus for solids, such as snack cakes, powders or liquid materials.

Further, from a sheet of the laminate of the invention, a container in the form of a cup (cup container) is produced by vacuum forming or air-pressure forming, and the cup container is filled with the contents, then covered with a commercially available cap material for heat sealing and heat sealed, whereby a container in which the contents are packaged is obtained. This container can be favorably used for packaging instant noodle, miso, tofu, jelly, pudding, snack cakes, electronic oven foods and retort foods.

Resin Composition (b) for Sealant

The present invention also relates to a resin composition (b) comprising a specific ethylene/α-olefin copolymer (A-b), a propylene polymer (B-b) and an ethylene polymer (C-b), a laminate using the composition, and a container. Next, their constitution is described in detail.

Ethylene/α-olefin Random Copolymer (A-b)

The ethylene/α-olefin random copolymer used as the component (A-b) in the resin composition of the invention is a random copolymer obtained by copolymerizing ethylene and an α-olefin of 3 to 20 carbon atoms, preferably 3 to 10 carbon atoms. Examples of the α-olefins include propylene, 1-butene, 1-pentene, 1-hexene, 4-methyl-1-pentene, 1-octene, 1-decene and 1-dodecene. Of these, 1-butene, 1-hexene and 1-octene are preferable. In the copolymer, the α-olefin content is in the range of usually 5 to 50% by mol, preferably 7 to 40% by mol, more preferably 7 to 30% by mol.

The melt flow rate (MFR-A, ASTM D 1238, 190° C., load of 2.16 kg) of the ethylene/α-olefin random copolymer is in the range of 0.1 to 10 g/10 min, preferably 0.1 to 7 g/10 min. The density (ASTM D 1505) of the copolymer is in the range of 0.850 to 0.900 g/cm$^3$, preferably 0.855 to 0.890 g/cm$^3$, and this copolymer is an amorphous one whose melting point, as determined by differential scanning calorimetry (DSC), is lower than 90° C. or is not observed.

Although there is no specific limitation on the process for preparing the ethylene/α-olefin random copolymer, the copolymer can be prepared by copolymerizing ethylene and an α-olefin in the presence of a Ziegler-Natta catalyst or a metallocene catalyst.

In the present invention, a composition obtained by blending several kinds of ethylene/α-olefin random polymers having different densities and/or MFR is also employable.

Propylene Polymer (B-b)

The propylene polymer (B-b) for use in the resin composition of the invention is a propylene homopolymer publicly known or a random or block copolymer of propylene and ethylene or an α-olefin of 4 to 20 carbon atoms. Especially, it is preferable to use a homopolymer or a random copolymer having a melt flow rate (ASTM D 1238, 230° C., load of 2.16 kg) of 0.5 to 100 g/10 min, preferably 1.0 to 70 g/10 min, more preferably 3 to 50 g/10 min. The ratio (MFR-B/MFR-A) of the melt flow rate (MFR-B) of the propylene polymer (B-b) to the melt flow rate (MFR-A) of the ethylene/α-olefin copolymer (A-b) is in the range of 3 or more, preferably 3 to 500, more preferably 5 to 200, most preferably 7 to 100. If the ratio (MFR-B/MFR-A) is less than 3, the resulting film has poor peel properties, and if the ratio is more than 500, the resulting film has poor appearance.

When the propylene polymer having a melt flow rate of the above range is used, a film exhibiting an excellent balance between the sealing strength and the easy peel properties is obtained.

The propylene polymer (B-b) can be prepared by polymerizing propylene or copolymerizing propylene and another α-olefin in the presence of, typically, a catalyst containing a solid titanium catalyst and an organometallic compound as main components or a metallocene catalyst containing a metallocene compound as one component.

Ethylene Polymer (C-b)

The ethylene polymer (C-b) in the resin composition of the invention may be an ethylene homopolymer or an ethylene/α-olefin copolymer, and its molecular structure may be a straight-chain one or a branched one having long or short side chain.

In case of the ethylene/α-olefin copolymer, the α-olefin used as a comonomer is an α-olefin of 3 to 20 carbon atoms, preferably 3 to 10 carbon atoms, and this copolymer is a random copolymer of ethylene and the α-olefin. Examples of the α-olefins include propylene, 1-butene, 1-pentene, 1-hexene, 4-methyl-1-pentene, 1-octene, 1-decene and 1-dodecene. Of these, propylene, 1-butene, 1-hexene and 1-octene are preferable. In the ethylene/α-olefin copolymer, other comonomers, e.g., dienes, such as 1,6-hexadiene and 1,8-octadiene, or cycloolefins, such as cyclopentene, may be contained in small amounts, when needed. The ethylene content in the copolymer is in the range of 85 to 99.9% by mol, preferably 90 to 99.5% by mol.

The ethylene polymer has a density of 0.900 to 0.960 g/cm$^3$, preferably 0.905 to 0.950 g/cm$^3$, more preferably 0.905 to 0.940 g/cm$^3$, and is so-called low-density or medium-density polyethylene. When the density is in this range, the resulting film exhibits excellent low-temperature heat-sealing properties.

The ethylene polymer has a melt flow rate (MFR-C, ASTM D 1238, 190° C., load of 2.16 kg) of 0.01 to 50 g/10 min, preferably 0.05 to 30 g/10 min. When the melt flow rate is in this range, the resulting film has an excellent balance between the sealing strength and the easy peel properties.

Although there is no specific limitation on the process for preparing the ethylene polymer, the polymer can be prepared by homopolymerizing ethylene or copolymerizing ethylene and an α-olefin using a radical polymerization catalyst, a Phillips catalyst, a Ziegler-Natta catalyst or a metallocene catalyst.

As the ethylene polymer, a polymer having a relationship between MFR(190° C.) and a melt tension (measured at 190° C., unit: mN, referred to as "MT" hereinafter) satisfying the following formula is particularly preferable.

$$40 \times [MFR(190° C.)]^{-0.67} \leq MT \leq 250 \times [MFR(190° C.)]^{-0.67}$$

An example of the ethylene polymer is so-called high-pressure low-density polyethylene obtained by radical polymerization.

As the ethylene polymer, a composition obtained by blending several kinds of ethylene polymers, such as a blend of high-pressure low-density polyethylene and a linear ethylene/α-olefin copolymer, is also employable.

Resin Composition

The resin composition (b) for a sealant of the invention comprises the ethylene/α-olefin copolymer (A-b), the propylene polymer (B-b) and the ethylene polymer (C-b). The amount of the component (A-b) is in the range of 10 to 70% by weight, preferably 20 to 60% by weight, the amount of the component (B-b) is in the range of 10 to 80% by weight, preferably 20 to 70% by weight, and the amount of the component (C-b) is in the range of 0 to 50% by weight, preferably 5 to 40% by weight. The total amount of the components (A-b), (B-b) and (C-b) is 100% by weight. When the amounts of these components are in the above ranges, a film obtained from the composition exhibits excellent easy peel properties, and by the use of the film, an easy-peelable container favorable for practical use is obtained.

The resin composition (b) of the invention is useful as a sealant having easy peel properties when used alone to form a film, but as described later, by laminating the film onto a specific resin layer, a laminate having excellent sealing properties and easy peel properties can be obtained.

In the present invention, additives, such as antioxidant, heat stabilizer, weathering stabilizer, slip agent, anti-blocking agent and crystal nucleating agent, may be contained when needed, within limits not detrimental to the performance of the resin composition of the invention.

It is possible that the above-mentioned components and various additives optionally used are blended by a mixing machine, such as a Henschel mixer, a Banbury mixer or a tumbling mixer, then the blend is extruded by a single-screw or twin-screw extruder to prepare pellets, and the pellets are used in the later-described film molding. It is also possible that the blend of the components is fed to a film molding machine.

Sealant Film

By film molding the resin composition (b) of the invention, a sealant film of a packaging material requiring easy peel properties can be produced. The film molding method may be a cast molding method or an inflation molding method, and an excellent film having a uniform thickness can be produced at a resin temperature of usually 180 to 240° C. The thickness of the film is in the range of usually 1 to 100 μm, preferably 3 to 80 μm.

Laminate

The sealant film of the invention may be used alone. However, a layer (X) of the sealant film is laminated onto at least one substrate film (Y) to form a laminate, and the laminate is generally used as a packaging film or a packaging sheet.

The substrate film (Y) is not specifically restricted, but for example, a film of polyolefin such as polyethylene or polypropylene, a film of a styrene resin, a film of polyester such as polyethylene terephthalate or polybutylene terephthalate, a film of polyamide such as nylon 6 or nylon 6,6, a stretched film thereof, a laminated film comprising a polyolefin film and a gas barrier resin film such as a polyamide film or an ethylene/vinyl alcohol copolymer film, a metal foil such as an aluminum foil, a metallized film having deposited aluminum, silica or the like, or a paper is appropriately selected and used according to the use purpose of the packaging material. For the substrate film (Y), these films may be used singly or in combination of two or more kinds.

For forming a laminate with the sealant film, a co-extrusion method or an extrusion lamination method wherein the aforesaid substrate resin and the sealant layer resin are co-extruded on the substrate film (Y) to give a three-layer laminate, only the sealant layer resin is extruded on the substrate film (Y) to give a two-layer laminate, and the aforesaid substrate resin and the sealant layer resin are co-extruded to give a two-layer laminate; and a dry lamination method wherein the substrate film (Y) and the sealant film are subjected to dry lamination are adoptable. Of these, the co-extrusion method or the extrusion lamination method is preferable from the viewpoint of productivity.

One embodiment of the laminate is a laminate having a structure of sealant film layer (X)/another substrate film layer (Y). The substrate film layer (Y) is a layer selected from the group consisting of the aforesaid polyolefin film, polystyrene film, polyester film, polyamide film, laminated film consisting of a polyolefin film and a gas barrier resin film, aluminum foil, metallized film and paper.

If the adhesion strength between the sealant film layer (X) of the invention and another substrate film layer (Y) is not sufficient, a structure of sealant film layer (X)/adhesive layer/another substrate film layer (Y) is available. As an adhesive resin of the adhesive layer, an anchor coating agent, such as a urethane or isocyanate adhesive, or modified polyolefin, such as unsaturated carboxylic acid graft polyolefin, is employable. By the use of such an adhesive resin, the adjacent layers can be firmly bonded.

There is no specific limitation on the thickness of the laminate, but when the laminate is used as a film of a cap material or the like, the thickness is in the range of usually 10 to 200 μm, and when the laminate is used for a cup or a tray sheet, the thickness is in the range of usually 200 to 1000 μm.

Container

A container can be produced by allowing the sealant film layers (X) of the laminates to face each other or allowing the sealant film layer (X) of the laminate to face another substrate film and then heat sealing at least a part of the periphery so as to give a desired container shape. By heat sealing the whole periphery, a sealed container in the form of a bag (sealed bag container) can be produced. If the molding process for producing the bag container is combined with a process for filling the contents, that is, if the contents are filled after heat sealing of the bottom and the sides of the bag container and then the top is heat sealed, a package can be produced. Therefore, the laminate can be used in an automatic packaging apparatus for solids, such as snack cakes, powders or liquid materials.

A container in the form of a cup (cup container) produced by vacuum forming or air-pressure forming, a container obtained by injection molding or blow molding, or a container formed from paper is filled with the contents, then covered with the laminate of the invention as a cap material and heat sealed, whereby a container in which the contents are packaged is obtained.

Further, from a sheet of the laminate of the invention, a container in the form of a cup (cup container) is produced by vacuum forming or air-pressure forming, and the cup container is filled with the contents, then covered with a commercially available cap material for heat sealing and heat sealed, whereby a container in which the contents are packaged is obtained. This container can be favorably used for packaging instant noodle, miso, tofu, jelly, pudding, snack cakes, electronic oven foods and retort foods.

The layer (X) comprising the resin composition (b) for sealant can be used in the same ways as the above layer (S) comprising the resin composition (a) for sealant. Specifically, (1) a laminate has at least two layers and a layer structure comprising a layer (P) comprised of a propylene random copolymer and a layer (X) comprised of the resin composition (b), the layer (X) being adjacent to the layer (P), (2) the layer (P) of the laminate (1) has a thickness of 2 to 30 μm,

- (3) a container comprises the laminate (1) having a layer structure of three or more layers wherein at least one surface layer is the layer (P) comprised of a propylene random copolymer, and it is in the form of bag obtained by allowing the layers (P) of the laminates to face each other and heat sealing a part of the periphery,
- (4) the container (3) comprises the laminate (1) having a layer structure of three or more layers wherein at least one surface layer is the layer (P) comprised of a propylene random copolymer, and it is in the form of bag obtained by folding the laminate in two in such a manner that the layer (P) comes inside to allow the layers (P) to face each other and heat sealing a part of the periphery,
- (5) the container (3) comprises two kinds of the laminates (1) having a layer structure of three or more layers wherein at least one surface layer is the layer (P) comprised of a propylene random copolymer, and is in the form of bag obtained by allowing the layers (P) of the two laminates to face each other and heat sealing a part of the periphery, and
- (6) a container comprises a cup formed from the laminate (1) having a layer structure of three or more layers wherein at least one surface layer is the layer (P) comprised of a propylene random copolymer, and a cap heat sealed to a surface of the layer (P) of the cup.

EFFECT OF THE INVENTION

According to the present invention, a laminate having both of sealing properties and heat-sealing properties, a resin composition for a sealant enabling production of an easy peel container using the laminate, a laminate using the composition, and a container (e.g., bag-like container or cup) obtained from the laminate can be provided.

By the use of the laminate obtained from the resin composition of the invention, a container having an excellent balance between the sealing properties and the easy peel properties can be obtained. Therefore, the container of the invention can be favorably used as a food-packaging container.

EXAMPLE

The present invention is further described with reference to the following examples, but it should be construed that the invention is in no way limited to those examples.

Example 1-a

Preparation of Resin Composition

In a Henschel mixer, 40% by weight of high-pressure polyethylene (density (ASTM D 1505): 0.927 g/cm$^3$, MFR (190° C.): 3.0 g/10 min, MT: 47.5 mN) as an ethylene polymer component, 30% by weight of a 1-butene homopolymer (density (ASTM D 1505): 0.915 g/cm$^3$, MFR (190° C.): 1.8 g/10 min) as a butene polymer component and 30% by weight of a propylene random copolymer (ethylene (comonomer) content: 4.0% by mol, MFR(230° C.): 1.5 g/10 min, melting point: 145° C.) as a propylene polymer component were homogeneously mixed.

Then, the resulting mixture was granulated by the use of a single-screw extruder having a screw diameter of 40 mm to obtain resin composition pellets.

Preparation of Laminate

A laminate of three layers of three kinds having the following layer structure was prepared by the use of a three-kind three-layer T-die cast molding machine having a die width of 300 mm equipped with an extruder having a screw diameter of 40 mm under the conditions of a molding temperature of 220° C. and a chill roll temperature of 30° C.

Layer Structure of Laminate

First Layer

Thickness: 10 μm

Starting resin: propylene random copolymer (ethylene (comonomer) content: 4.0% by mol, MFR(230° C.): 1.5 g/10 min, melting point: 145° C.)

Second Layer

Thickness: 20 μm

Starting resin: resin composition pellets obtained in the preparation of resin composition Third Layer Thickness: 450 μm Starting resin:

(1) homopolypropylene 90% by weight (MFR(230° C.): 0.5 g/10 min)

(2) high-pressure polyethylene 10% by weight (MFR (190° C.): 3.0 g/10 min, density (ASTM D 1505): 0.927 g/cm$^3$)

The first layer of the laminate obtained as above was allowed to face a polypropylene layer (thickness: 25 μm) of a commercially available film (nylon/polypropylene laminated film) having a thickness of 37 μm, and they were heat sealed. Then, the initial sealing strength was measured in accordance with the following method, and the peel properties were evaluated in accordance with the following method. The results are set forth in Table 1-a.

(1) Method to Measure Initial Sealing Strength

Two test strips having a width of 15 mm were prepared, and they were superposed one upon the other and heat sealed under the conditions of a temperature of 170° C., a pressure of 0.2 MPa and a sealing time of 1 second.

Thereafter, the strips were peeled from each other in the direction of 180° at a rate of 300 mm/min to measure a maximum value of the peel strength, and the measured value was regarded as an initial sealing strength (N/15 mm).

(2) Method to Evaluate Peel Properties

After the measurement of the heat-sealing strength (initial sealing strength), the film sample was observed. A film having been neither stretched nor broken was regarded as pass and represented by AA, and a film having been stretched or broken was regarded as fail and represented by BB.

Comparative Example 1-a

A laminate was prepared in the same manner as in Example 1-a, except that the resin composition for forming the second layer was replaced with only the same propylene polymer as used in the preparation of the resin composition to form the second layer. The initial sealing strength of the resulting laminate was measured in accordance with the above method, and the peel properties of the laminate were evaluated in accordance with the above method. The results are set forth in Table 1-a.

Comparative Example 2-a

A laminate was prepared in the same manner as in Example 1-a, except that the resin composition for forming the second layer was replaced with the composition indicated in Table 1-a to form the second layer. The initial sealing strength of the resulting laminate was measured in accordance with the above method, and the peel properties of the laminate were evaluated in accordance with the above method. The results are set forth in Table 1-a.

TABLE 1-a

|  | Ex. 1-a | Comp. Ex. 1-a | Comp. Ex. 2-a |
|---|---|---|---|
| Resin formulation of first layer (wt %) |  |  |  |
| Propylene random copolymer | 100 | 100 | 100 |
| Resin formulation of second layer (wt %) |  |  |  |
| Ethylene polymer | 40 | 0 | 11 |
| Butene polymer | 30 | 0 | 80 |
| Propylene polymer | 30 | 100 | 9 |
| Resin formulation of third layer (wt %) |  |  |  |
| Homopolypropylene | 90 | 90 | 90 |
| High-pressure polyethylene | 10 | 10 | 10 |
| Initial sealing strength (N/15 mm) | 10.8 | 14.5 | 13.7 |
| Peel properties | AA | BB (break of film) | BB (break of film) |

As is evident from the results set forth in Table 1-a, the laminate of the invention had a good balance of initial sealing strength (sealing properties) and easy peel properties. The initial sealing strength of 10.8 N/15 mm is a strength at which the laminate is easily peelable with hand. If the laminate is broken when peeled with hand, it is impossible to easily open a sealed container.

Example 1-b

Preparation of Resin Composition

In a Henschel mixer, 30% by weight of an ethylene/1-butene copolymer (density: 0.885 g/cm$^3$, MFR(190° C.): 0.5 g/10 min) as an ethylene/α-olefin copolymer component, 50% by weight of random polypropylene (MFR(230° C.): 7.0 g/10 min, melting point by DSC: 138° C.) as a propylene polymer component and 20% by weight of high-pressure polyethylene (density: 0.921 g/cm$^3$, MFR(190° C.): 0.3 g/10 min) as an ethylene polymer component were homogeneously mixed. The resulting mixture was granulated by the use of a single-screw extruder having a screw diameter of 40 mm to obtain resin composition pellets.

Preparation of Laminate

A laminate of three layers of three kinds having the following layer structure was prepared by the use of a three-kind three-layer T-die cast molding machine having a die width of 300 mm equipped with an extruder having a screw diameter of 40 mm under the conditions of a molding temperature of 230° C. and a chill roll temperature of 70° C. The first layer of the resulting laminate and a propylene layer (thickness: 25 μm) of a commercially available film (nylon/polypropylene laminated film) having a thickness of 37 μm were heat sealed, and the initial sealing strength, the peel properties and the peel traces after peeling were evaluated. The results are set forth in Table 1-b.

Layer Structure

First Layer (Sealant Layer) (X)
  Thickness: 20 μm
  Starting resin: resin composition pellets obtained in the preparation of resin composition Second Layer (Another Substrate Film) (Y-1)
  Thickness: 20 μm
  Starting resin: random polypropylene (MFR(230° C.): 1.5 g/10 min, melting point: 145° C.)

Third Layer (Another Substrate Film) (Y-2)
  Thickness: 450 μm
  Starting resin:
    homopolypropylene 90% by weight (MFR(230° C.): 0.5 g/10 min)
    high-pressure polyethylene 10% by weight (MFR(190° C.): 0.3 g/10 min, density: 0.921 g/cm$^3$)

(1) Initial Sealing Strength

Two test strips having a width of 15 mm were prepared, and they were superposed one upon the other and heat sealed under the conditions of a temperature of 170° C., a pressure of 0.2 MPa and a sealing time of 1 second. Thereafter, the strips were peeled from each other in the direction of 180° at a rate of 300 mm/min to measure a maximum value of the peel strength, and the measured value was regarded as an initial sealing strength (N/15 mm).

(2) Peel Properties

After the measurement of the heat-sealing strength, the film sample was observed. A film having been neither stretched nor broken was regarded as pass and represented by AA, and a film having been stretched or broken was regarded as fail and represented by BB.

(3) Peel Traces

After the measurement of the heat-sealing strength, peel traces of the film sample were observed. A film having no angel hair was taken as AA, and a film having angel hair was taken as BB.

Example 2-b, Comparative Example 1-b

A laminate was prepared in the same manner as in Example 1-b, except that in the preparation of resin composition, the amounts of the ethylene/α-olefin copolymer component, the propylene polymer component and the ethylene polymer component were changed as described in Table 1-b. Then, the laminate was evaluated. The results are set forth in Table 1-b.

Comparative Example 2-b

A laminate was prepared in the same manner as in Example 1-b, except that in the preparation of resin composition, homopolypropylene (MFR(230° C.): 0.5 g/10 min, melting point: 160° C.) was used as the propylene polymer component. Then, the laminate was evaluated. The results are set forth in Table 1-b.

TABLE 1-b

|  | Ex. 1-b | Ex. 2-b | Comp. Ex. 1-b | Comp. Ex. 2-b |
|---|---|---|---|---|
| Formulation of first layer |  |  |  |  |
| Ethylene/1-butene copolymer (wt %) | 30 | 50 | 5 | 30 |
| Random polypropylene (wt %) | 50 | 50 | 75 | 0 |
| Homopolypropylene (wt %) | 0 | 0 |  | 50 |
| High-pressure polyethylene (wt %) | 20 | 0 | 20 | 20 |
| MFR-B/MFR-A | 14 | 14 | 14 | 1 |
| Sealing strength (N/15 mm) | 19.6 | 24.5 | 39.2 | 5.7 |
| Peel properties | AA | AA | BB | AA |
| Peel traces | AA | AA | BB | BB |

As is evident from the results set forth in Table 1-b, the laminate of the invention had a good balance of sealing strength and easy peel properties, and no peel traces.

What is claimed is:

1. A resin composition for a sealant, comprising:

(A-b) an ethylene/α-olefin copolymer having a density of 0.850 to 0.900 g/cm$^3$ and a melt flow rate (MFR-A), as measured at 190° C., of 0.1 to 10 g/10 min, in an amount of 10 to 70% by weight, said copolymer having an α-olefin content of 7 to 30 mol %, (B-b) a propylene polymer having a melt flow rate (MFR-B), as measured at 230° C., of 0.5 to 100 g/10 min and a ratio of MFR-B to MFR-A (MFR-B/MFR-A) of 3 to 500, in an amount of 10 to 80% by weight, and (C-b) an ethylene polymer having a density of 0.900 to 0.960 g/cm$^3$, in an amount of 0 to 50% by weight.

2. A sealant film comprising the resin composition of claim 1 and having a thickness of 1 to 100 μm.

3. A resin composition according to claim 1, wherein said component (A-b) comprises a random copolymer of ethylene and an α-olefin having 3 to 20 carbon atoms.

4. A resin composition according to claim 1, wherein component (A-b) is amorphous and has a melting point as determined by differential scanning calorimetry lower than 90° C.

5. A resin composition according to claim 3, wherein said α-olefin has from 3 to 10 carbon atoms.

6. A resin composition according to claim 1, wherein said component (B-b) is selected from the group consisting of (1) a propylene homopolymer, (2) a random or block copolymer of propylene and ethylene, and (3) a random or block copolymer of propylene and an α-olefin of 4 to 20 carbon atoms.

7. A resin composition according to claim 6, wherein said component (B-b) comprises a propylene homopolymer.

8. A resin composition according to claim 6, wherein said component (B-b) comprises a random or block copolymer of propylene and ethylene, or a random or block copolymer of propylene and an α-olefin of 4 to 20 carbon atoms.

9. A resin composition according to claim 1, wherein said component (C-b) is selected from the group consisting of an ethylene homopolymer and an ethylene/α-olefin copolymer.

10. A resin composition according to claim 9, wherein said α-olefin has from 3 to 20 carbon atoms.

11. A resin composition according to claim 9, wherein said component (C-b) comprises an ethylene/α-olefin copolymer wherein said the ethylene content of said copolymer is in the range of 85–99.5% by weight.

12. A resin composition according to claim 1, wherein said component (C-b) is a high pressure, low density polyethylene.

* * * * *